United States Patent
Tripathy et al.

(10) Patent No.: US 11,354,377 B2
(45) Date of Patent: Jun. 7, 2022

(54) METHODS AND APPARATUS FOR AUTOMATICALLY PROVIDING ITEM REVIEWS AND SUGGESTIONS

(71) Applicant: Walmart Apollo, LLC, Bentonville, AR (US)

(72) Inventors: Chittaranjan Tripathy, Sunnyvale, CA (US); Siddharth Pratap Singh, Sunnyvale, CA (US); Ioannis Pavlidis, Boulder, CO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/349,772

(22) Filed: Jun. 16, 2021

(65) Prior Publication Data

US 2021/0406336 A1 Dec. 30, 2021

Related U.S. Application Data

(60) Provisional application No. 63/045,377, filed on Jun. 29, 2020.

(51) Int. Cl.
| | | |
|---|---|---|
| *G06F 3/00* | (2006.01) | |
| *G06F 16/957* | (2019.01) | |
| *G06F 16/9536* | (2019.01) | |
| *G06F 16/9535* | (2019.01) | |

(52) U.S. Cl.
CPC ...... *G06F 16/9577* (2019.01); *G06F 16/9535* (2019.01); *G06F 16/9536* (2019.01)

(58) Field of Classification Search
None
See application file for complete search history.

(56) References Cited

U.S. PATENT DOCUMENTS

| | | | |
|---|---|---|---|
| 8,001,003 B1 * | 8/2011 | Robinson | G06Q 30/0201 |
| | | | 705/7.29 |
| 8,924,261 B2 | 12/2014 | Stinchcomb | |
| 10,007,936 B1 * | 6/2018 | Ghoshal | G06Q 50/01 |
| 2010/0030578 A1 | 2/2010 | Siddique et al. | |
| 2011/0321072 A1 | 12/2011 | Patterson et al. | |

(Continued)

FOREIGN PATENT DOCUMENTS

WO 2016070213 A1 5/2016

*Primary Examiner* — Thanh T Vu
(74) *Attorney, Agent, or Firm* — Duane Morris LLP; Manita Rawat

(57) ABSTRACT

This application relates to apparatus and methods for automatically providing item reviews. In some examples, a website provides a widget on a website allowing a customer to request an item review for an item. In response to the customer requesting the item review, a computing device determine whether suitable reviews for the item are available. If suitable reviews are available, the reviews are provided to the customer requesting the item review. If suitable reviews are not available, the computing device determines a set of customers to request item reviews for the item from, and provides item review requests to the determined set of customers. The computing device receives responses to the item review requests received from the set of customers, and provides an item review based on the received item review requests. In some examples, the website provides the item review to the customer requesting the item review.

18 Claims, 10 Drawing Sheets

(56) References Cited

U.S. PATENT DOCUMENTS

2014/0172744 A1\* 6/2014 El-Hmayssi ........... G06Q 50/01
                                                   705/347
2018/0047071 A1\* 2/2018 Hsu ................... G06Q 30/0282
2021/0357994 A1\* 11/2021 Lavasanijou ...... G06Q 30/0282

\* cited by examiner

METHODS AND APPARATUS FOR AUTOMATICALLY PROVIDING ITEM REVIEWS AND SUGGESTIONS

CROSS-REFERENCE TO RELATED APPLICATIONS

This application claims priority to U.S. Provisional Patent Application No. 63/045,377, filed on Jun. 29, 2020 and entitled "METHODS AND APPARATUS FOR automatically PROVIDING ITEM REVIEWS AND SUGGESTIONS," which is hereby incorporated by reference in its entirety.

TECHNICAL FIELD

The disclosure relates generally to item reviews and, more specifically, to electronically determining and providing item reviews.

BACKGROUND

At least some websites, such as retailer websites and online marketplaces, allow customers to purchase items. The websites may display, for each item, one or more images, a description of the item, and an item price. In some examples, the websites may display item reviews for each listed item. The item reviews may be provided by customer's wishing to provide the item reviews after they have purchased the item. For example, a customer may purchase on item on the website and then, subsequent to the purchase, provide a review of the item on the website. The item review may then become available on the website for others to consider. The displayed item reviews, however, may not indicate a true indication of customers' review of items.

For example, item reviews may become stale. The item reviews may have been provided months or even years from when a new customer is considering to purchase the item. In some examples, the item reviews may be for an older version of the item than is now being made available for purchase on the website. In some examples, customers may not provide item reviews for items they have purchased. For example, customers purchasing am item may forget to provide an item review, or may simply not be willing to provide the item review because they have already purchased the item and do not want to take the time to provide the item review.

In some examples, the emotional state of customers may lead to item reviews that are biased towards either "good" reviews, or "bad" reviews. For example, customers that purchase an item, who were relying on the item for an important reason, may tend to provide item reviews more often that customers who purchase the item for less important reasons. If their experience is negative, the item review may be biased towards bad reviews, even though there may be a significant amount of customers who purchase the items and were happy with the item. As such, there are opportunities to address the providing of item reviews on websites.

SUMMARY

The embodiments described herein are directed to allowing customers to request item reviews. Item reviews may include, for example, text based reviews, recommendations, ratings, rankings, suggestions, and the like. The item review requests are provided to customers with relevant experience with the items. For example, the embodiments ensure the requests are provided to customers who have recently purchased the items, are in the process of buying the items, or are interested in the items. The item reviews may be received from other anonymous customers who have recently interacted with the item such as through recent purchases, frequent browsing, etc., to help the requesting customer make further informed decisions on the purchase beyond what is present on an item detail page, for example. In some examples, the embodiments automatically request the item reviews from such customers. The requests may be received from and provided to customers in real-time (e.g., "on-the-fly"), such that requesting customers derive an experience similar to that of asking fellow buyers of the item (e.g., in person) for their experience.

In some examples, a customer requests the item reviews from an item-detail page (IDP) of a website. The IDP may display one or more of an image of an item, an item description, and the item reviews, for example. The IDP may also allow a customer to purchase the item. The embodiments may provide the item review requests to other customers on the IDP of the website, such that those customers may provide their reviews of the item via the IDP. For example, the embodiments may provide the item review requests to customers currently viewing the IDP of the corresponding item. In some examples, the embodiments limit the number of item review requests that any individual customer is given.

In some examples, the item reviews are provided to customers that have requested the item reviews. In some examples, the item reviews are automatically provided to customers based on each customer's purchase history (e.g., purchase data) or interaction with the website (e.g., session data). In some examples, the embodiments, through one or more text-based processes, summarize the item reviews and provide the summarized item reviews to customers.

As such, the embodiments may benefit customers in one or more ways. For example, the embodiments may allow customers to obtain more honest, and recent, item reviews. The embodiments may also allow customer to obtain reviews upon request, thereby improving customer experience.

The embodiments may also benefit retailers in one or more ways. For example, the embodiments may allow a retailer to offer its customers the capability of providing and obtaining human-level recommendations on request and, in some examples, automatically. These capabilities may allow for greater customer engagement through active participation in requesting and providing the item reviews, as well as customer loyalty at least due to the feeling that the customer is assisted at a time when the customer wants the assistance. As such, the retailer may see an increase in sales due to the confidence that customer's may now have in the retailer's listed item reviews. Further, the retailer may also see cost savings in that customers may less often contact the retailer (e.g., via chat) for information on items they are considering to purchase.

Moreover, the embodiments may allow the retailer to understand trends of items, and identify trending items based on, for example, which and how many customers are seeking item suggestions for each item. Based on the information, the embodiments may allow retailers to provide more relevant item reviews to each customer, for example. Persons of ordinary skill in the art having the benefit of these disclosures may recognize additional benefits as well.

In accordance with various embodiments, exemplary systems may be implemented in any suitable hardware or hardware and software, such as in any suitable computing device. For example, in some embodiments, a website provides a widget on a website allowing a customer to request an item review for an item. In response to the customer requesting the item review, a computing device determine whether suitable reviews for the item are available. If suitable reviews are available, the reviews are provided to the customer requesting the item review. If suitable reviews are not available, the computing device determines a set of customers to request item reviews for the item from, and provides item review requests to the determined set of customers. The computing device receives responses to the item review requests received from the set of customers, and provides an item review based on the received item review requests. In some examples, the website provides the item review to the customer requesting the item review.

In some embodiments, a computing device is configured to determine an item that has not received an item review within a period of time. The computing device is also configured to determine an item engagement value for each of a plurality of users based on user session data for the item for each of a plurality of users. Further, the computing device is configured to determine a subset of the plurality of users based on the item engagement values. The computing device is configured to determine when each user of the subset of the plurality of users is browsing an item detail page of a website corresponding to the item. The computing device is also configured to display an item review request for the item when each user is determined to be browsing the item detail page.

In some embodiments, a computing device is configured to receive an item review request in response to a user engaging a portion of a website. The computing device is also configured to determine a subset set of a plurality of users based on item engagement values for each of the plurality of users. The computing device is further configured to transmit the item review request to the subset of the plurality of users. The computing device is also configured to receive at least one item review response from the subset of the plurality of users in response to the item review requests. The computing device is further configured to display the at least one item review response.

In some embodiments, a computing device is configured to determine an item needing an item review. The computing device is also configured to determine one or more features based on attributes of the item. The computing device is further configured to determine at least one item review request for the item based on the one or more features. The computing device is configured to determine a subset of users based on corresponding item engagement scores for the item. The computing device is also configured to transmit the at least one item review request to the subset of users.

In some embodiments, one or more methods corresponding to functions performed by the configured computing device are provided. In yet other embodiments, a non-transitory computer readable medium has instructions stored thereon, where the instructions, when executed by at least one processor, cause a computing device to perform operations corresponding to the methods.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
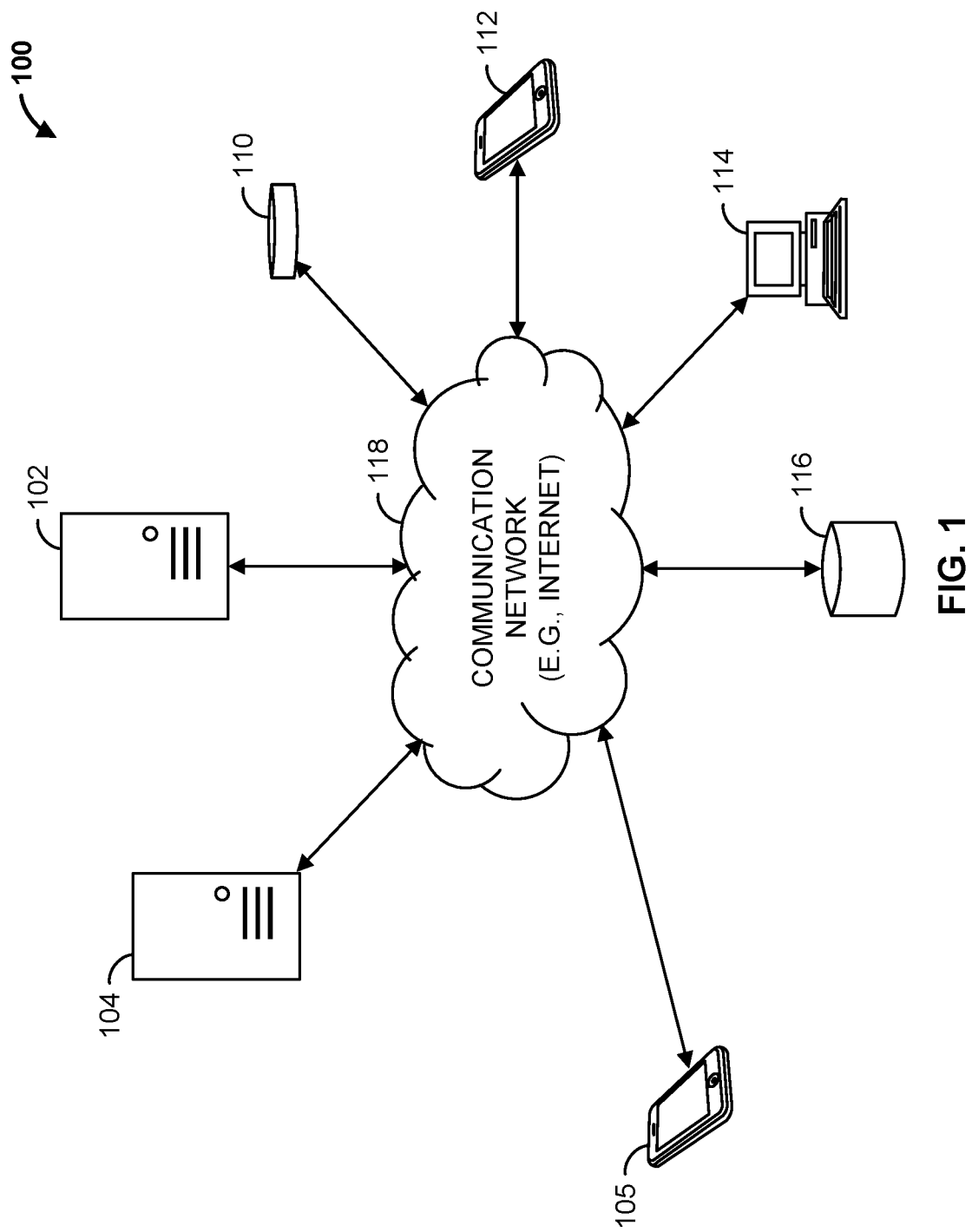
FIG. 1 is a block diagram of an item review determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item review determination system 100 that includes an item review determination computing device 102 (e.g., a server, such as an application server), a web server 104, workstation(s) 106, database 116, and multiple customer computing devices 105, 110, 112, 114 operatively coupled over network 118. Item review determination computing device 102, workstation(s) 106, web server 104, and multiple customer computing devices 105, 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, item review determination computing device 102 can be a computer, a workstation, a laptop, a server such as a cloud-based server, or any other suitable device. In some examples, each of multiple customer computing devices 105, 110, 112, 114 can be a cellular phone, a smart phone, a tablet, a personal assistant device, a voice assistant device, a digital assistant, a laptop, a computer, or any other suitable device. In some examples, item review determination computing device 102 is operated by a retailer, and multiple customer computing devices 105, 110, 112, 114 are operated by customers of the retailer.

Although FIG. 1 illustrates four customer computing devices 105, 110, 112, 114, item review determination system 100 can include any number of customer computing devices 110, 112, 114. Similarly, item review determination system 100 can include any number of item review determination computing devices 102, workstation(s) 106, web servers 104, and databases 116.

Item review determination computing device 102 is operable to communicate with database 116 over communication network 118. For example, item review determination computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item review determination computing device 102, in some examples, database 116 can be a local storage device, such as a hard drive, a non-volatile memory, or a USB stick. In some examples, item review determination computing device 102 stores item data in database 116. The item data may include, for example, one or more of an item identifier (e.g., item ID), an item description, an item price, an item image, item options, an item brand, an item manufacturer, item reviews, or any other data related to the item.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, web server 104 hosts one or more web pages, such as a retailer's website. For example, web server 104 may host an online marketplace where customers may view and purchase items. The webpage may include an item-detail page (IDP) (e.g., product-detail pages (PDPs)) for each item, where the IDP includes, for each item, one or more of an item image, an item description, an item price, item options, and item reviews. Customers may, via customer computing devices 110, 112, 114 communicating with web server 104 over communication network 118, visit the online marketplace and view the item listings via the IDPs. For example, FIG. 3 illustrates an item detail page 300 for an item that includes an item image 302 of the item, an item description 304 of the item, item options 306 for the item, and item reviews 370 for the item.

Customers may also purchase the listed items via the website. For example, the website (e.g., via each IDP) may provide an "add-to-cart" that, when engaged (e.g., clicked on) by the customer, facilitates the placement of items into an online shopping cart. As illustrated in FIG. 3, item detail page 300 includes add-to-cart icon 308 to allow customers to add the item to an online shopping cart. The website may further provide a "checkout" icon that facilitates the purchase of the items in the online shopping cart.

Figure 3:
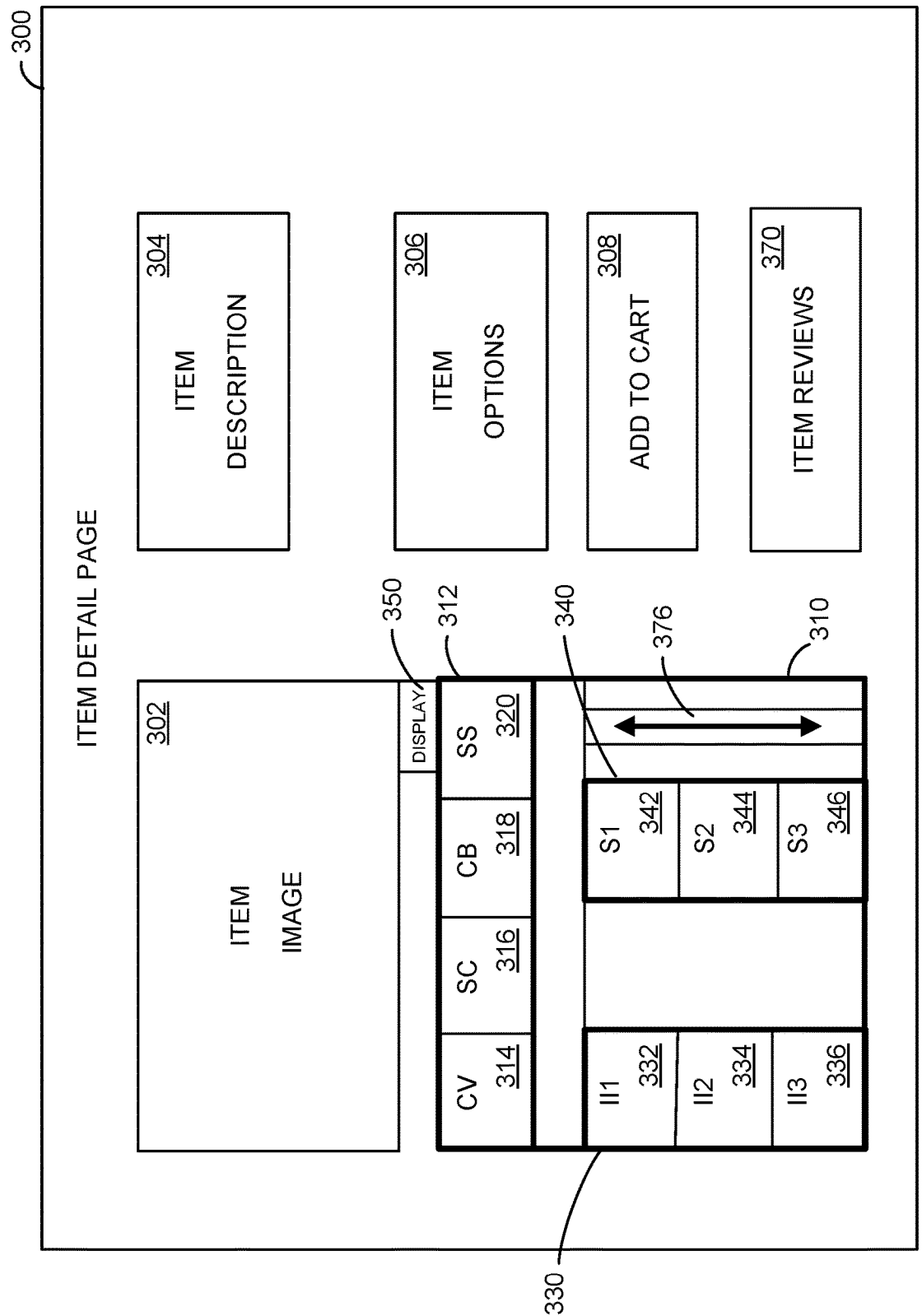
FIG. 3 illustrates an item detail page in accordance with some embodiments.

In FIG. 3, item detail page 300 further includes an item review widget 310 that, in some examples, is displayed underneath item image 302. For example, a customer may engage display icon 350 to cause item review widget 310 to be displayed. Once displayed, engagement of display icon 350 may cause item review widget 310 to be removed from display.

Item review widget 310 may include display areas (e.g., icons) customers viewing 314, shopping carts 316, customers bought 318, and seek suggestion 320. Display area customer viewing 314 displays an indication of a number of customers currently viewing the item. Display area shopping carts 316 displays an indication of a number of customers with online shopping carts that (e.g., currently) include the item. Display area customers bought 318 displays an indication of a number of customers that have recently purchased the item. For example, display area customers bought 318 may display an indication of how any customers have purchased the item within a previous period of time (e.g., the last two weeks, the last month, the last three days, etc.). The period of time may configurable and stored in database 116, for example. Each of these indications may be, for example, a number (e.g., 1 of 5), a bar graph, a color (e.g., based on what range the corresponding number of customers falls within), a proportion of customers that liked the item (e.g., 7 of 12 customers like the item), or any other suitable indication. In some examples, a customer must engage (e.g., click on) customers viewing 314, shopping carts 316, customers bought 318 to view the corresponding indication.

Display area seek suggestion 320 allows a customer to request item reviews for the item corresponding to item detail page 300. For example, upon engaging display area seek suggestion 320, web server 104 may send an item review request to item review determination computing device 102. Web server 104 may, in response to the engagement, send a request for item reviews for the item to item review determination computing device 102. In some examples, engagement of the display area seek suggestion 320 causes a text display area to appear (e.g., pop up), where the user may enter textual information. Web server 104 may send the textual information to item review determination computing device 102.

Upon receiving the item review request, item review determination computing device 102 may obtain item reviews for the item, such as from database 116. In some examples, if item review determination computing device 102 receives textual information as part of the item review request, item review determination computing device 102 may perform one or more text based processes to determine if any of the item reviews in database 116 are related to the textual information. In some examples, item review determination computing device 102 executes one or more machine learning processes to identify the item reviews.

In some examples, item review determination computing device 102 executes one or more algorithms to identify a plurality of customers from whom to request item reviews for the item. The plurality of customers may be customers currently viewing an IDP of the item. Upon receiving responses from one or more of the plurality of customers, item review determination computing device 102 may aggregate the item review responses (e.g., in database 116), and may transmit the item reviews to web server 104. In some examples, item review determination computing device 102 generates a summary of the item reviews, and provides the summary of the item reviews to web server 104. Upon receiving the item review responses, web server 104 may display the item reviews to the customer. For example, and referring to FIG. 3, web server 104 may receive item reviews 370 for an item from item review determination computing device 102, and may display item reviews 370 on item detail page 300.

In some examples, item review widget 310 further provides display area item review request 330, which may identify item review requests for one or more items (e.g., products, goods, services). In this example, display area item review request 330 includes a plurality of item images 332, 334, 336 identifying corresponding items to review. For example, first item image 332 may be an image of a first item to review. Likewise, second item image 334 may be an image of a second item to review, and third item image 336 may be an image of a third item to review.

Item review widget 310 may further include display area item review response 340 for providing item reviews, which may include a plurality of suggestion boxes 342, 344, 346. For example, a user may engage (e.g., select) one of the suggestion boxes 342, 344, 346, and provide an item review. Each of the plurality of suggestion boxes 342, 344, 346 corresponds to one of the plurality of item images 332, 334, 336 has a corresponding suggestion box 342, 344, 346.

In some examples, selection of one of the suggestion boxes 342, 344, 346 allows a customer to provide text as an item review (e.g., via a pop-up box that allows for the entry of text). In some examples, selection of one of the suggestion boxes 342, 344, 346 allows a customer to select a rating for the corresponding item (e.g., a selection of 1 to 5, a selection of a descriptor such as "good," "bad," or "ok", a selection of a color, etc.). Although only three item images 332, 334, 336 and corresponding suggestion boxes 342, 344, 346 are illustrated, any number of item images 332, 34, 336 and corresponding suggestion boxes 342, 344, 346 may be employed (although, as described herein, item review determination computing device 102 may limit the number of requested item reviews to each customer). For example, scroll bar 376 allows the customer to scroll to additional item images 332, 34, 336 and corresponding suggestion boxes 342, 344, 346.

In some examples, item review widget 310 indicates whether an item (e.g., associated with the item detail page 300) is trending (e.g., based on purchases, or views, of the item). In some examples, item review widget 310 indicates price reductions or sales of the item on the website. In some examples, item review widget 310 can indicate whether a store (e.g., local store) has a promotion of the item. The local store may be determined based on store preferences stored in database 116 for the customer, or based on Global Positioning System (GPS) location data for the customer, for example.

Figure 2:
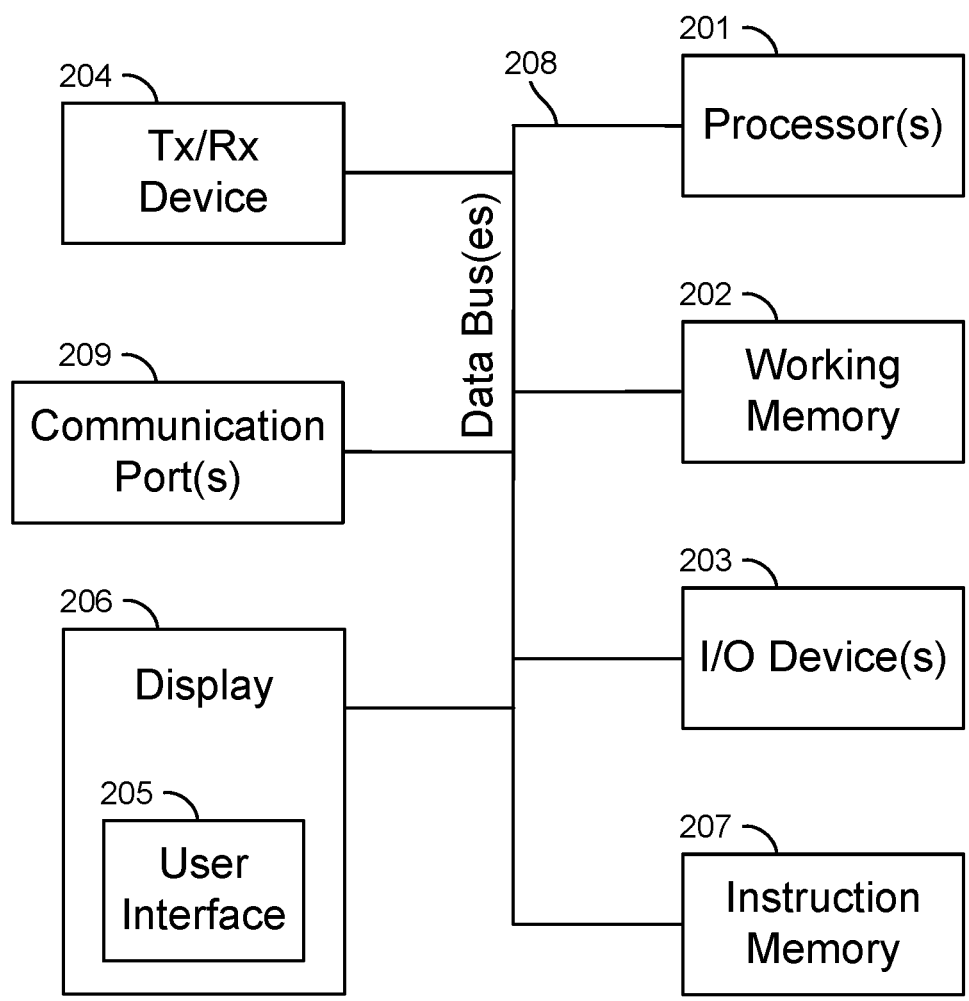
FIG. 2 is a block diagram of an item review determination computing device of the item review determination system of FIG. 1 in accordance with some embodiments.

FIG. 2 illustrates the item review determination computing device 102 of FIG. 1. Item review determination computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item review determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as item data.

Display 206 can display user interface 205. User interfaces 205 can enable user interaction with item review determination computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item review determination computing device 102 will be operating in. Processor(s) 201 is operable to receive data from, or send data to, a network, such as communication network 118 of FIG. 1, via transceiver 204.

Figure 4:
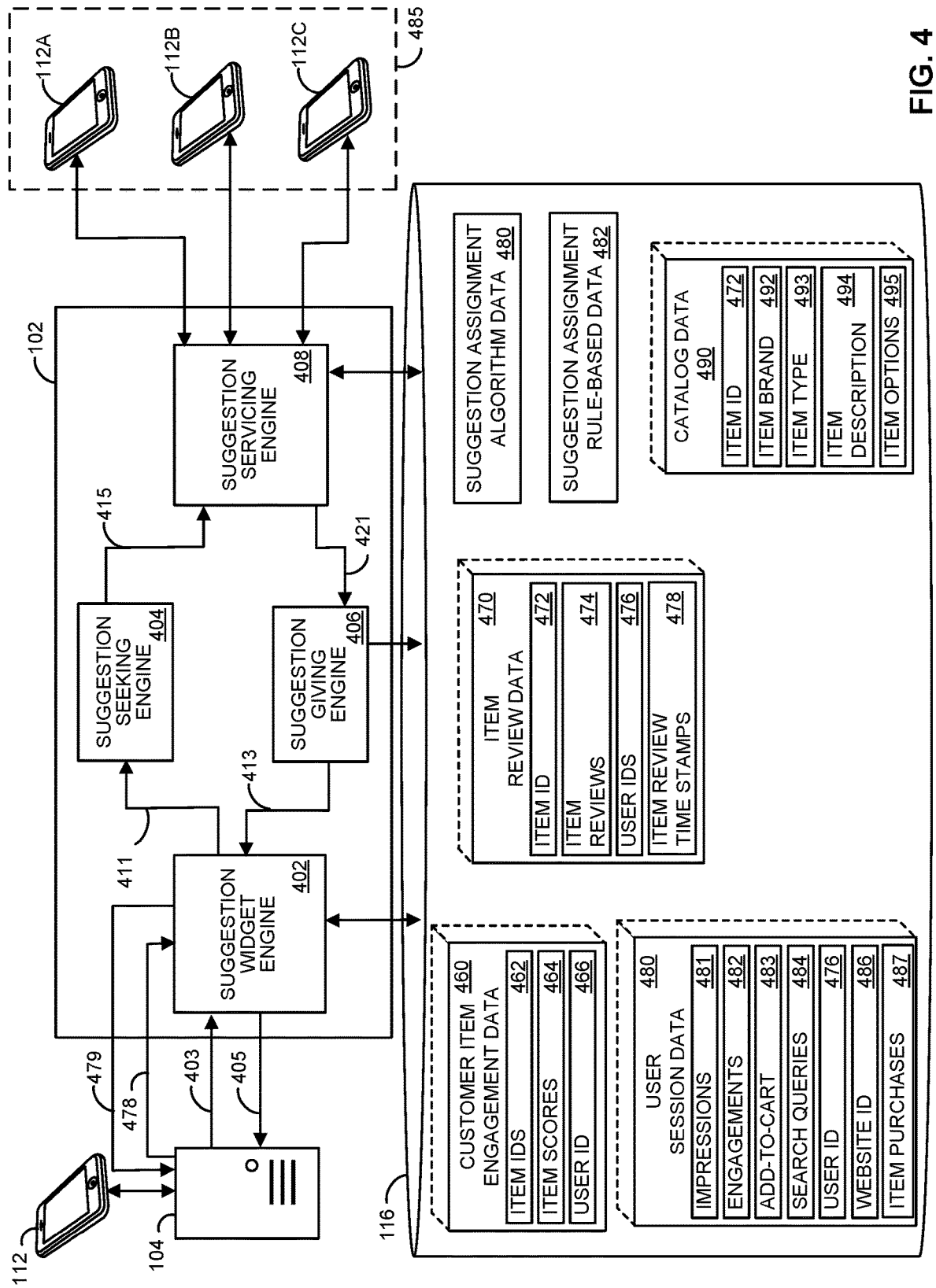
FIG. 4 is a block diagram illustrating examples of various portions of the item review determination system of FIG. 1 in accordance with some embodiments.

FIG. 4 is a block diagram illustrating examples of various portions of the item review determination system 100 of FIG. 1. As indicated in the figure, item review determination computing device 102 includes suggestion widget engine 402, suggestion seeking engine 404, suggestion giving engine 406, and suggestion servicing engine 408. In some examples, one or more of request suggestion widget engine 402, suggestion seeking engine 404, suggestion giving engine 406, and suggestion servicing engine 408 may be implemented in hardware. In some examples, one or more of suggestion widget engine 402, suggestion seeking engine 404, suggestion giving engine 406, and suggestion servicing engine 408 may be implemented as an executable program maintained in a tangible, non-transitory memory, such as instruction memory 207 of FIG. 2, that may be executed by one or processors, such as processor 201 of FIG. 2.

In this example, web server 104 may host a website that includes at least one item detail page, such as item detail page 300. A customer operating first customer computing device 112 may cause first customer computing device 112 to display the item detail page (e.g., by using a browser to proceed to the item detail page). The item detail page may include, for example, display areas customers viewing 314, shopping carts 316, customers bought 318, and seek suggestion 320.

For display area customers viewing 314, web server 104 may determine the number of customers viewing the item based on a number of customers currently requesting access to the item detail page. Similarly, for display area shopping carts 316, web server 104 may determine the number of customers with the item in their shopping carts based on a number of customers currently with the item in their shopping carts.

For display area customers bought 318, web server 104 may transmit an item purchase request 478 to item review determination computing device 102. In response to item purchase request 478, suggestion widget engine 402 may determine the number of customers that have purchased the item over a previous period of time. In some examples, web server 104 indicates the previous period of time in item purchase request 478. In some examples, item review determination computing device 102 determines the previous period of time based on, for example, a configuration setting stored in database 116. In response to the request, item review determination computing device 102 may generate item purchase response 479 indicating the number of customers that have purchased the item over the previous period of time (e.g., in the past week, month, three months, or an amount of time depending on the type of item), and may transmit item purchase response 479 to web server 104 for display.

A customer may request item reviews for the item associated with item detail page 300 by engaging seek suggestion 320. Upon engaging seek suggestion 320, web server 104 may transmit an item review request 403 to item review determination computing device 102. Suggestion widget engine 402 may receive the item review request 403 and determine whether database 116 is storing item reviews for the item.

For example, as illustrated in the figure, database 116 stores item review data 470 for each of a plurality of items. Item review data 470 may include, for example, item identifier (ID) 472, which identifies each item such as an SKU number, or any other item identifier. Item review data 470 further includes item reviews 474 that were provided by customers associated with user IDs 476, as well as item review time stamps 478 indicating a date and/or time of when the item reviews 474 were provided by customers associated with user IDs 476.

If database 116 is storing item reviews 474 for the item, suggestion widget engine 402 further determines whether at least a number (e.g., threshold) of the stored item reviews were provided within a previous period of time (e.g., time window). The number of required reviews and the period of time may be configuration settings stored in database 116, for example. Assuming that database 116 is storing at least the number of item reviews 474 that were provided within the previous period of time, suggestion widget engine 402 generates and provides to web server 104 item review response 405, which identifies the item reviews 474 for the item.

In some examples (e.g., based on a configuration option), suggestion widget engine 402 may summarize the item reviews 474 for the item based on one or more text-based processes. For example, suggestion widget engine 402 may generate word embeddings (e.g., using Word2Vec) for each of the item reviews 474, determine and remove duplicative words/statements, and may further remove extra or unimportant words and/or terms to generate a summarized item review for the item. The summarized item review may then be provided via item review response 405 to web server 104 for display.

If, however, suggestion widget engine 402 determines that there aren't the number of required reviews provided over the period of time, suggestion widget engine 402 may provide an item seek request to suggestion seeking engine 404 over communication link 411. The item seek request may be a request to seek item reviews for the corresponding item, and may identify the item (e.g., via item ID 472).

Based on receiving the item seek request, suggestion seeking engine 404 may determine a plurality of customers to request a review of the item. In some examples, suggestion seeking engine 404 may employ one or more algorithms to determine the plurality of customers. For example, suggestion seeking engine 404 may obtain from database 116 suggestion assignment algorithm data 480 and/or suggestion assignment rule-based data 482. Suggestion assignment algorithm data 480 may identify and characterize one or more algorithms, such as machine learning algorithms. Suggestion assignment rule-based data 482 may identify and characterize one or more rules. Suggestion seeking engine 404 may execute one or more of suggestion assignment algorithm data 480 and/or suggestion assignment rule-based data 482 to determine the plurality of customers.

As an example, suggestion assignment rule-based data 482 may include one or more rules. For example, one rule may require that a customer must have purchased the item within a previous period of time to be included in the plurality of customers. As another example, another rule may require that a customer must have viewed the item a number of times within a previous period of time to be included in the plurality of customers. As yet another example, another rule may require that a customer have not been provided an item review request within a previous period of time, and yet another rule may require that the customer opt in to receiving such requests. Another rule may require that the customer have purchased an item in a same category as the item during a previous period of time.

Suggestion widget engine 402 may determine which customers satisfy any of these rules based on, for example, user session data 478 and/or catalog data 490 stored in database 116. For example, web server 104 may transmit to item review determination computing device 102 user session data 478 for each customer that browses a website, such as a website hosting item detail pages 300. User session data 478 includes, for each customer, item impressions 481 (e.g., item views), item engagements 482 (e.g., item clicks), add-to-cart 483 (e.g., items added to the online shopping cart), search queries 484, user ID 476, website ID 486 (e.g., URL of a webpage, such as item detail pages 300), and item purchases 487 (e.g., any items the customer purchased on the website). In some examples, item purchases 487 includes items the customer purchased at a store (e.g., rather than online).

Catalog data 490 may identify, for each of the plurality of items, an item ID 472 (e.g., an SKU number), item brand 492, item type 493 (e.g., grocery item such as milk, clothing item), item description 494 (e.g., a description of the item, item features, such as ingredients, benefits, use or consumption instructions, or any other suitable description), and item options 495 (e.g., item colors, sizes, flavors, etc.).

Suggestion widget engine 402 may obtain user session data 478 and/or catalog data 490 from database 116 and may apply one or more of the rules to user session data 480 to determine the plurality of customers. Suggestion seeking engine 404 may require satisfaction of any combination and/or number of these or other rules to include a customer in the plurality of customers.

Additionally or alternatively, suggestion seeking engine 404 may execute suggestion assignment algorithm data 480 to determine whether the customer is to be included in the plurality of customers. In some examples, suggestion assignment algorithm data 480 is an algorithm based on item engagement scores.

For example, database 116 may further store customer item engagement data 460, which includes item IDs 462, user ID 476, and item scores 464 corresponding to item ID 462. Item scores 464 may be item engagement scores determined based on engagements 482 for each customer. Item scores 464 may be generated according to any known method (e.g. algorithm), for example. Suggestion assignment algorithm data 480 may include one or more algorithms, such as machine learning algorithms, that operate on item engagement data, such as item scores 464. As such, in some examples, suggestion seeking engine 404 can "match" customers to item review requests based on execution of suggestion assignment algorithm data 480 that operates on item engagement data. In some examples, item scores 464 may be generated based on a suggestion assignment algorithm, which is may be a (multi-)matching algorithm that maximizes the overall sum of engagement scores of customers with the items such that no customer is asked a review query that is not relevant. In addition, the customer being sent the item review request may not be overwhelmed by having to answer too many queries.

Suggestion seeking engine 404 may provide the matched customers to suggestion servicing engine 408 over communication link 415. In response, suggestion seeking engine 404 transmits item review requests to the identified customers. For example, as illustrated in FIG. 4, suggestion servicing engine 408 may transmit item review requests to customer computing devices 112A, 112B, and 112C. Each of customer computing devices 112A, 112B, and 112C may display the item review requests to the customers (e.g., via an application executing on each of customer computing devices 112A, 112B, and 112C). In some examples, suggestion seeking engine 404 transmits the item review requests to web server 104. Web server 104 may then display the item review requests on an item detail page of one or more items. For example, web server 104 may provide the item review requests via display area item review request 330 and display area item review response 340. Specifically, web server 104 may identify an item image 332 for the item corresponding to the item review request, and provide a corresponding suggestion box 342 for the customer to provide a response.

Suggestion servicing engine 408 may further receive item review response from the customers. For example, suggestion servicing engine 408 may receive an item review response from each of customer computing devices 112A, 112B, 112C. In some examples, suggestion servicing engine 408 stores the item review responses in database 116 (e.g., as item reviews 474) for each customer. In some examples, suggestion servicing engine 408 may summarize the item review responses, as described herein. Suggestion servicing engine 408 may provide the item review responses to suggestion giving engine 406 over communication link 421.

Suggestion giving engine 406 may then provide the item review responses to suggestion widget engine 402 over communication link 413. Suggestion widget engine 402 may parse and package the item review responses to generate item review response data 405, and provides the item review response data 405 to web server 104. Web server 104 may then display the item reviews via item reviews 370 on item detail page 300.

Merely for convenience, this example illustrates customer computing device 112 requesting item reviews from item review determination computing device 102, and receiving item review responses based on item reviews from a plurality of other customer computing devices 112A, 112B, 112C. Although not illustrated, each of the other customer computing devices 112A, 112B, 112C may similarly request item reviews from item review determination computing device 102, and may receive item review responses based on item reviews from a plurality of other customer computing devices (e.g., including customer computing device 112).

An Example Mathematical Formulation and Algorithm

As noted above, suggestion seeking engine 404 may combine rules (e.g., as defined by suggestion assignment rule-based data 482) and algorithms (e.g., as defined by suggestion assignment algorithm data 480) to assign item review requests to customers. As an example, assume there are m customers in a set C, and n items in a set P. For each customer i and item j there is an item engagement score (e.g., a probability score) assignment $p_{ij}$ (e.g., as defined by item scores 464) for the customer i's engagement with the item j. This may be represented as an m×n matrix E where each matrix entry $e_{ij} \in R^{\geq 0}$. During a time window T (e.g., a sliding window of stride 1 day and size 1 week ending on the current date), let indicator $X_{ij}$ represents whether customer i is actively engaged with the item j. An active engagement of customer i with item j may be defined as one or more of engagement events, such as viewing the item (e.g., impressions 481), adding the item to an online shopping cart (e.g., add-to-cart 483), or a buying event (e.g., item purchases 487).

Based on the item engagement scores, suggestion seeking engine 404 may identify a subset of the m customers in set C. Suggestion seeking engine 404 may provide an indication of the subset of customers to suggestion servicing engine 408 over communication link 415. Suggestion servicing engine 408 may then transmit item review requests to the subset of customers. For example, suggestion servicing engine 408 may multicast an item review request query $q_{ij}$ in a completely anonymized manner to customer computing devices 112A, 112B, and 112C. The item review requests may operate as inquiries as to whether the other active customers (e.g., operating customer computing devices 112A, 112B, and 112C) would share their review (e.g., experience, opinion, rating, ranking) of the item. For example, the item review requests may include textual information, such as questions about the item. For example, the item review requests may include an inquiry such as "Do you think this product will last for 3 months?"

Customers receiving the item review requests (e.g., the subset of the m customers in set C) may respond with an item review response. Suggestion servicing engine 408 may receive the item review responses. In some examples, the item review responses include Boolean data (e.g., YES or NO), numeric data (e.g. 1-5), or textual data. In some examples, suggestion servicing engine 408 aggregates the item review responses for an item, and formulates an aggregated item review response (e.g., "90% of the customers are happy with this product and over 60% of those think that it will work longer than advertised.").

In determining the subset of the m customers in set C, suggestion seeking engine 404 may filter out some of the customers in set C based on one or more rules as identified by suggestion assignment rule-based data 482. For example, suggestion seeking engine 404 may employ one or more of the following rules:

1. A customer i can issue queries $q_{ij}$ for any number of items, that is $j \in \{1, \ldots, n\}$.
2. A customer i may receive at most $r_i \in N$ distinct queries of the form $q_{ij}$ to respond to during a period T.
3. In some examples, each a customer i may be asked the same query $q_{ij}$, for $r_{ij}$ times where $r_{ij} \leq k_j$ (say $k_j=3$), and $k_j$ is a threshold set for the item j. In this setting, the sum of $r_{ij}$ over all j is at most $r_i$. In other words, the customer is asked the same question at most $k_j$ (say $k_j=3$) times for the item j so that: (1) at no point of time the customer will have the same query in a pending-to-answer queue (e.g., display area item review request 330, display area item review response 340) assuming the query has been answered once by the customer within a certain window of time (say in past six months), or (2) the customer has not answered the query in a past number of requests (e.g., $k_j-1$ times), within a certain a window of time, for example, in a month.
4. In some examples, no item review request for an item will starve, in other words will not be sent to a customer for potential answering, if the item review request can be assigned to another customer without exceeding the limit r for that other customer.
5. For each item j during the time window T, at least $l_j \in N$ responses are needed, in some examples, before suggestion servicing engine 408 summarizes the responses. This is to formulate a more statistically relevant summarization.

Formally, a bipartite graph may be defined, such as bipartite graph G=(U=C, V=P, E), where C is the set of m customers, P is the set of all items, and the edge set E={(u, v)|u ∈U and v ∈V}, that is each edge has one endpoint on a customer and the other endpoint on an item, In addition, a multi-matching M ⊆E represents a many-to-many relation, that is, each v ∈V matches with a subset of $S_u \subseteq U$, which may be formulated using the following maximization function:

$$\text{maxmize} \sum_{\substack{1 \leq i \leq m \\ 1 \leq j \leq n}} e_{ij} x_{ij} \quad \text{(eq. 1)}$$

$$\text{subject to} \sum_{1 \leq j \leq n} x_{ij} \leq r_i \; i = 1, \ldots, m$$

$$\sum_{1 \leq i \leq m} x_{ij} \geq l_j \; j = 1, \ldots, n,$$

Figure 10:
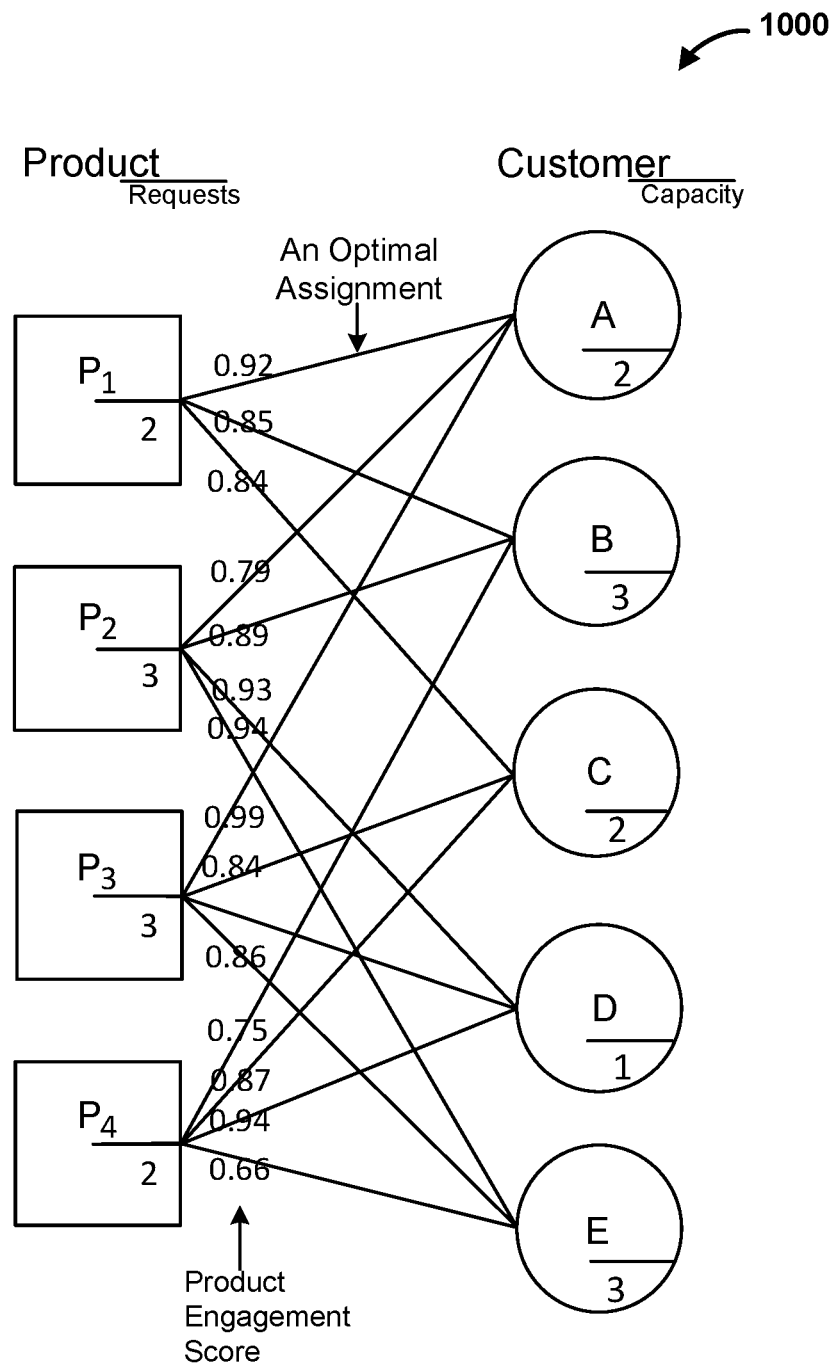
FIG. 10 is an illustration of an optimal assignment, 1 in accordance with some embodiments.

Here, $x_{ij}=1$ if $e_{ij}$ is included in the solution M; otherwise, $x_{ij}=0$. FIG. 10 shows an example of an optimal assignment.

In some examples, suggestion seeking engine 404 maximized the above equation based on item engagement scores, as determined based on the following maximization function:

$$\text{maxmize} \sum_{\substack{1 \leq i \leq m \\ 1 \leq j \leq n}} e_{ij} x_{ij} = \Sigma(\text{engagement score}), \quad \text{(eq. 2)}$$

Here, $x_{ij}=1$ if $e_{ij}$ is included in the solution M (i.e., the customer i is assigned the query j to answer); otherwise, $x_{ij}=0$. As such, the above algorithm maximizes the sum of engagement scores assuring that no customer is overwhelmed with more than a threshold number of queries to answer. The algorithm further assures that no query is starved, that is, does not have a customer who can potentially answer the query. In addition, the algorithm employs an exploration-exploitation strategy to adaptively maximize the objective. While exploration gathers more information and learns from customer interactions (e.g., based on answered the queries), exploitation makes better decisions given the current information. For example, the exploration strategy may learn that if a customer is not usually responsive while another customer is responsive and has capacity to answer additional queries (e.g., the capacity constraint is not violated), suggestion servicing engine 408 may send the item search request to the second customer with the hope that the customer will respond to the item search request.

This process, in essence, may simulate a human's adaptive way of decision making by gathering and then exploiting the information. For example, in a market (e.g., a farmer's market), if a customer asked a fellow shopper about their opinion on an item (e.g., an exotic vegetable such as white bitter melon) and the fellow shopper is not responsive, then the customer may ask another shopper to gather more information so that the customer can make a more informative decision whether to buy that item.

Figure 5:
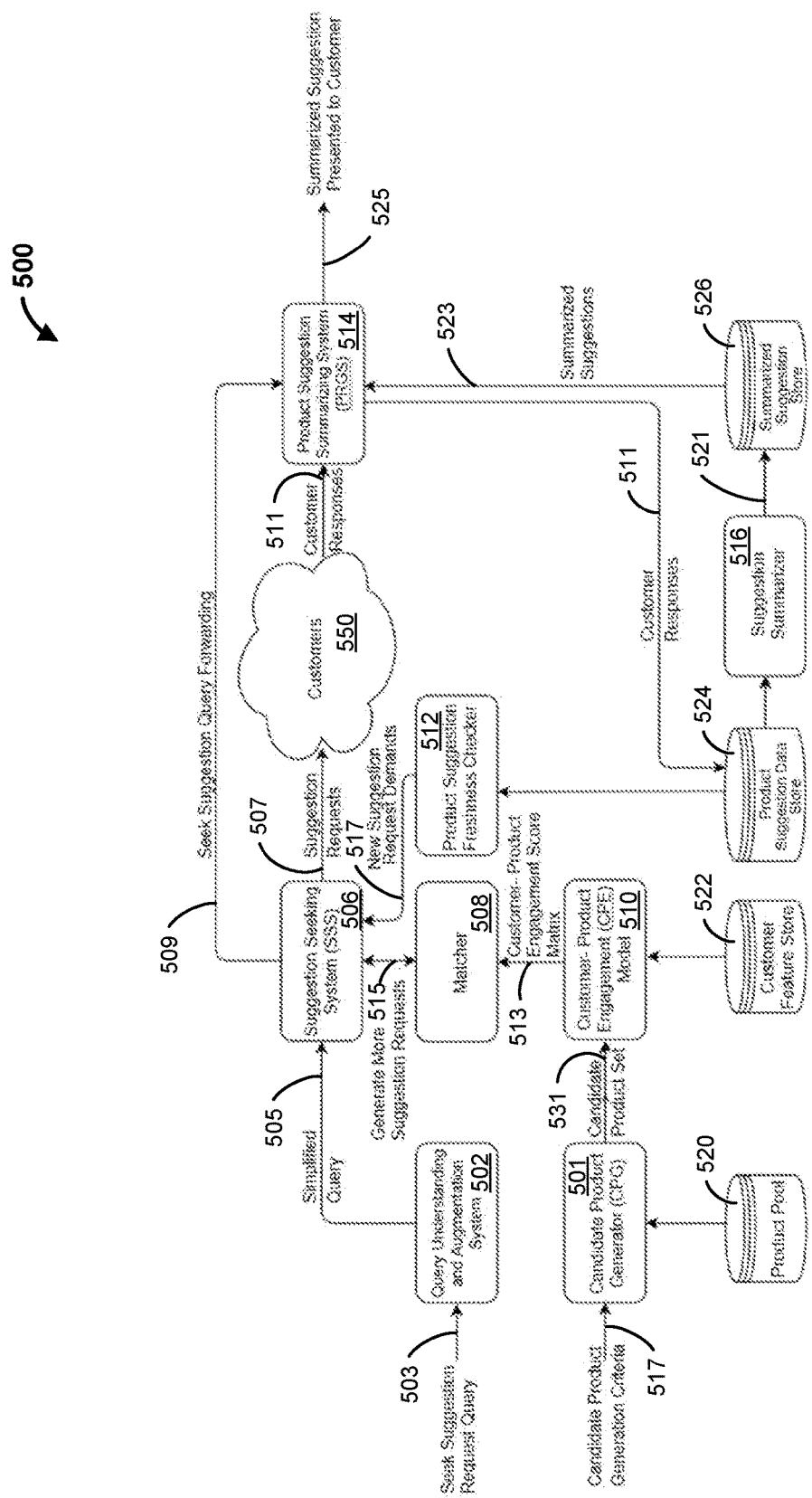
FIG. 5 is a block diagram of various exemplary functions performed by the item review determination computing device of FIG. 1 in accordance with some embodiments.

FIG. 5 illustrates exemplary functions 500 that may be performed by item review determination computing device 102. For example, one or more of Candidate Product Generator 501, Query Understanding and Augmentation System 502, Suggestion Seeking System 506, Matcher 508, Customer-Product Engagement Model 510, Product Suggestion Freshness Checker 512, Product Suggestion Summarizing System 514, and Suggestion Summarizer 516 may be implemented by processor(s) 201 executing instructions, which may be obtained by processor(s) 201 from instruction memory 207.

Product pool 520 may identify a pool of items. Customer feature store 522 may identify customer engagement data for a plurality of customers. Product Suggestion Data Store 524 may store customer responses to item review requests. Suggestion Summarizer 516 may summarize the responses for a particular query, and store the summarized response 521 in Summarized Suggestion Store 526. Each of Product Pool 520, Customer Feature Store 522, Product Suggestion Data Store 524, and Summarized Suggestion Store 526 may be a database, such as database 116.

In this example, a customer generates a seek suggestion query 503 (e.g., by engaging display area seek suggestion 320 of item review widget 310). Query Understanding and Augmentation System 502 understands the query, decodes the intent, and simplifies the query to generate simplified query 505 so that the answering entity (e.g., another customer) will find it easy to give a response, such as in one of the following forms: by pressing a button, selecting from a list of pre-defined answers, giving a numeric answer or enter a textual answer.

Suggestion Seeking System 506 receives the simplified query 505 and consults the Product Suggestion Freshness Checker 512 to see if there exist enough fresh reviews for the product based on a time window T, so that they can be summarized, and an answer can be composed. For example, Product Suggestion Freshness Checker 512 obtains the reviews from Product Suggestion Data Store 524 to make the determination. If there are enough fresh reviews, then the reviews are forwarded 509 to the Product Suggestion Summarizing System 514, which stores the responses in Product Suggestion Data Store 524. Suggestion Summarizer 516 reads the responses from Product Suggestion Data Store 524, and generates summarized suggestions 521 based on the customer responses. Suggestion Summarizer 516 then stores the summarized suggestions 521 in Summarized Suggestion Store 526.

Product Suggestion Summarizing System 514 may then obtain the summarized suggestions 523 from Summarized Suggestion Store 526, and provide the summarized suggestions 525 to the customer. Product Suggestion Summarizing System 514 can be a simple aggregator of the numeric or binary response data or a natural language processing system which uses a deep neural network that does a sequence-to-sequence modeling with attention mechanism in order to summarize the textual responses of the customers about a product that the querying customer may find useful in deciding whether to buy the product or not.

If, however, there aren't enough fresh reviews, the Product Suggestion Freshness Checker 512 identifies, via suggestion request demands 517, how many additional customers the query must be sent to in order to generate a number of responses. Suggestion Seeking System 506 then invokes Matcher 508 (e.g., which may employ the algorithms described in Section "Mathematical Formulation and Algorithm") to identify customers 515 to send suggestion requests (e.g., item review requests) to. For example, Suggestion Seeking System 506 may provide the simplified query(ies) 505 to Matcher 508. Matcher 508 may use a customer-product engagement score matrix 513 that is computed by Customer-Product Engagement Model 510 (which may be a machine learning model), and assigns the query to a set of customers based on the customer-product engagement score matrix 513. For example, Matcher 508 may assign the query to a number of customers with the greatest item engagement scores (e.g., the customers with the top 100 item engagement scores for the item). Customer-Product Engagement Model 510 may receive a candidate product set 531 from Candidate Product Generator 501 to generate the customer-product engagement score matrix 513.

Suggestion Seeking System 506 sends the suggestion requests 507 to the customers 550 over the networked computer system (such as over Internet, to cellphones, other hand-held devices as applicable). Product Suggestion Summarizing System 514 then receives the responses 511 (e.g., item reviews 474) from customers 550, and stores the responses in Product Suggestion Data Store 524. In some examples, Product Suggestion Summarizing System 514 determines timestamps (e.g., item review time stamps 478) of when the responses 511 were received, and may store the responses 511 in Product Suggestion Data Store 524. Suggestion Summarizer 516 reads the responses from Product Suggestion Data Store 524, and generates summarized suggestions based on the customer responses. Suggestion Summarizer 516 then stores the summarized suggestions 521 in Summarized Suggestion Store 526.

Product Suggestion Summarizing System 514 may obtain (e.g., read) the summarized suggestions 523 from Summarized Suggestion Store 526, and may provide 525 the summarized suggestions to the customer. For example, Product Suggestion Summarizing System 514 may transmit the summarized suggestions to the customer, which may be displayed by an Application executing on the customer's computing device, or may transmit the responses to a web server 104, where the web server 104 displays the summarized suggestions on an item detail page 300 when the customer is views the item detail page 300.

In some examples, item review determination computing device 102 executes functions 500 periodically (e.g., once in a day). In some examples, item review determination computing device 102 executes functions 500 in real-time (e.g., as seek suggestion request queries 503 are received).

A customer may respond to the suggestion requests 507 sent by Suggestion Seeking System 506 by, for example, pressing a button, selecting a response from a set of predetermined responses (e.g., "good," "bad," "ok"), or by selecting one of an options of responses as provided by a suggestion seeking customer (e.g., when the suggestion seeking customer enters textual information as part of the item review request). The suggestion request 507 may be a binary query, for example. For each item, gathering a set of queries may performed in one of various ways.

For example, when an item is uploaded to a retailer's website, a human agent may provide sample questions about the item. The questions may be collected and used as item request queries. In another method, sample questions about the item can be gathered using a crowd-sourcing framework (e.g., crowd-sourced question selection model), where the item is sent to a set of people (part of the crowd) who then come up with a set of possible questions that may be used as item request queries.

The Proactive Suggestion Model

In some examples, item review determination computing device 102 may employ machine learning, and more specifically, natural language processing, to proactively generate item review requests. For example, a candidate set S of items is determined for which item review requests are to be generated. The candidate set S of items may be determined based on items that are trending (e.g., items that are heavily viewed on the website or sold) but lacking suggestions from the customers. In some examples, the candidate set S of items may include new items (e.g., with potential for heavy customer engagement), or items that are typically sell (e.g., in high volumes) but that lack (e.g., a threshold number of) customer suggestions. In some examples, for each item in S, a suggestion request 507 is generated (e.g., by the Suggestion Seeking System 506).

In some examples, for each item in S, item attributes such as category, brand (item brand 492), price, description (e.g., item description 494), options (e.g., item options 495), possible usages of the item, or any other attributes are used to generate features of the product. If some examples, features may also be generated based on previous suggestion requests 507 and/or customer responses 511. Based on the features, Suggestion Seeking System 506 executes a trained neural network model $Q_M$ (e.g., deep neural network model) to generate a candidate set of suggestion request queries 507, which may be added to a pool of queries (e.g., for a particular item). Matcher 508 may then match the generated suggestion request queries 507 to a set of customers (in this example, Matcher 508 matches customers to suggestion request queries 507 based on customer-product engagement score matrix 513). Suggestion Seeking System 506 may then transmit the suggestion request queries 507 to the matched set of customers 550.

In some examples, the $Q_M$ model employs a seq2seq model that generates suggestion request queries 507 based on text (e.g., paragraphs) of combined and summarized reviews and/or suggestions for similar items. The model is trained with a training set of data that is based on the set of similar items for which suggestions and queries are previously accumulated.

In some examples, item review determination computing device 102 proactively identifies products for which it can generate Suggestion Requests 507 either by using the crowd-sourced queries or previously compiled queries from other customers or using a natural language processing model such as deep neural seq2seq model to generate questions. For example, item review determination computing device 102 may generate the Suggestion Requests 507 so as to gather suggestions for products on behalf of customers such that there is always a threshold number of fresh suggestions/reviews (e.g., suggestions/reviews received within a previous period of time) present in the Product Suggestion Data Store 524 and hence a prospective customer's Seek Suggestion Request Query 503 can be served without having to subsequently request the suggestions/reviews from a customer (e.g., in real-time).

Figure 6:
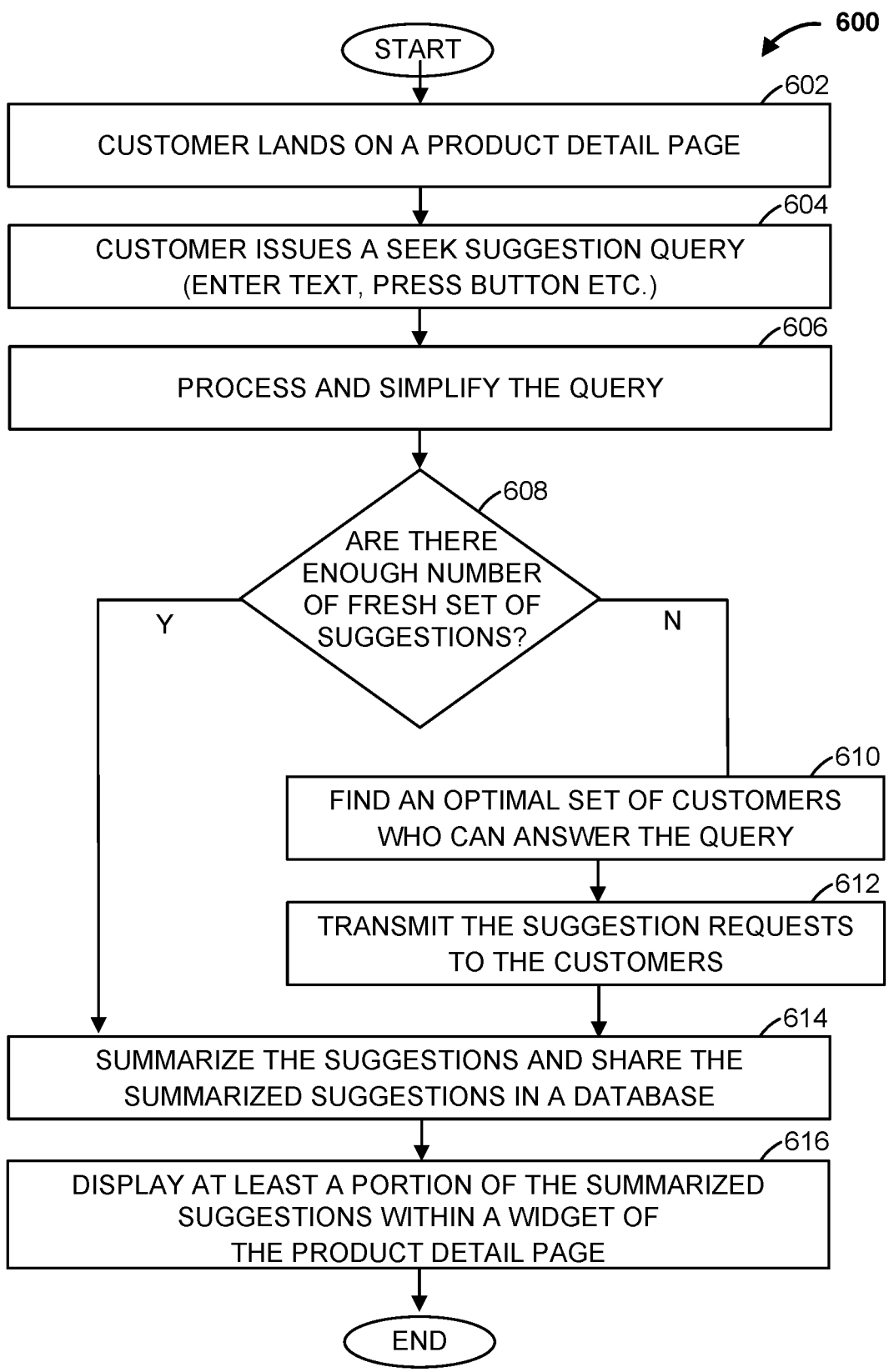
FIG. 6 is a flowchart of an example method that can be carried out by the item review determination computing device of FIG. 1 in accordance with some embodiments.

FIG. 6 is a flowchart of an example method 600 that can be carried out by a computing device, such as the item review determination computing device 102 of FIG. 1. At step 602, a customer lands on a product detail page. For example, a customer, operating a customer computing device 112, may view an item's detail page (e.g., via a web browser executing on the customer computing device 112), such as item detail page 300, on a website hosted by web server 104. At step 604, the customer issues a seek suggestion query. For example, the customer may click on a seek suggestion 320 display area (e.g., icon) of an item review widget 310 310 on the product detail page. At step 606, the seek suggestion query is processed and simplified. For example, Query Understanding and Augmentation System 502 may process and simplify the seek suggestion query to generate simplified query 505.

Proceeding to step 608, a determination is made as to whether there are an enough (e.g., threshold) number of fresh suggestions (e.g., responses) for the simplified query. If there are enough fresh suggestions, the method proceeds to step 614. Otherwise, if there are not enough fresh suggestions, the method proceeds to step 610.

At step 610, an optimal set of customers are identified who may answer the seek suggestion query. For example, Matcher 508 may employ a customer-product engagement score matrix 513 that is computed by Customer-Product Engagement Model 510 to assign the seek suggestion query to a set of customers based on a customer-product engagement score matrix 513. At step 612, the seek suggestion requests are transmitted to the identified customers. The method then proceeds to step 614.

At step 614, any received suggestions (e.g., responses from the customers) are summarized, and the summarized suggestions are stored in a database. For example, Suggestion Summarizer 516 may generate summarized suggestions 521 based on the customer responses, and may store the summarized suggestions 521 in Summarized Suggestion Store 526. At step 616, at least a portion of the summarized suggestions are displayed within a widget of the product detail page. For example, the summarized suggestions may be displayed as item reviews 370 on item detail page 300 for the corresponding item. The method then ends.

Figure 7:
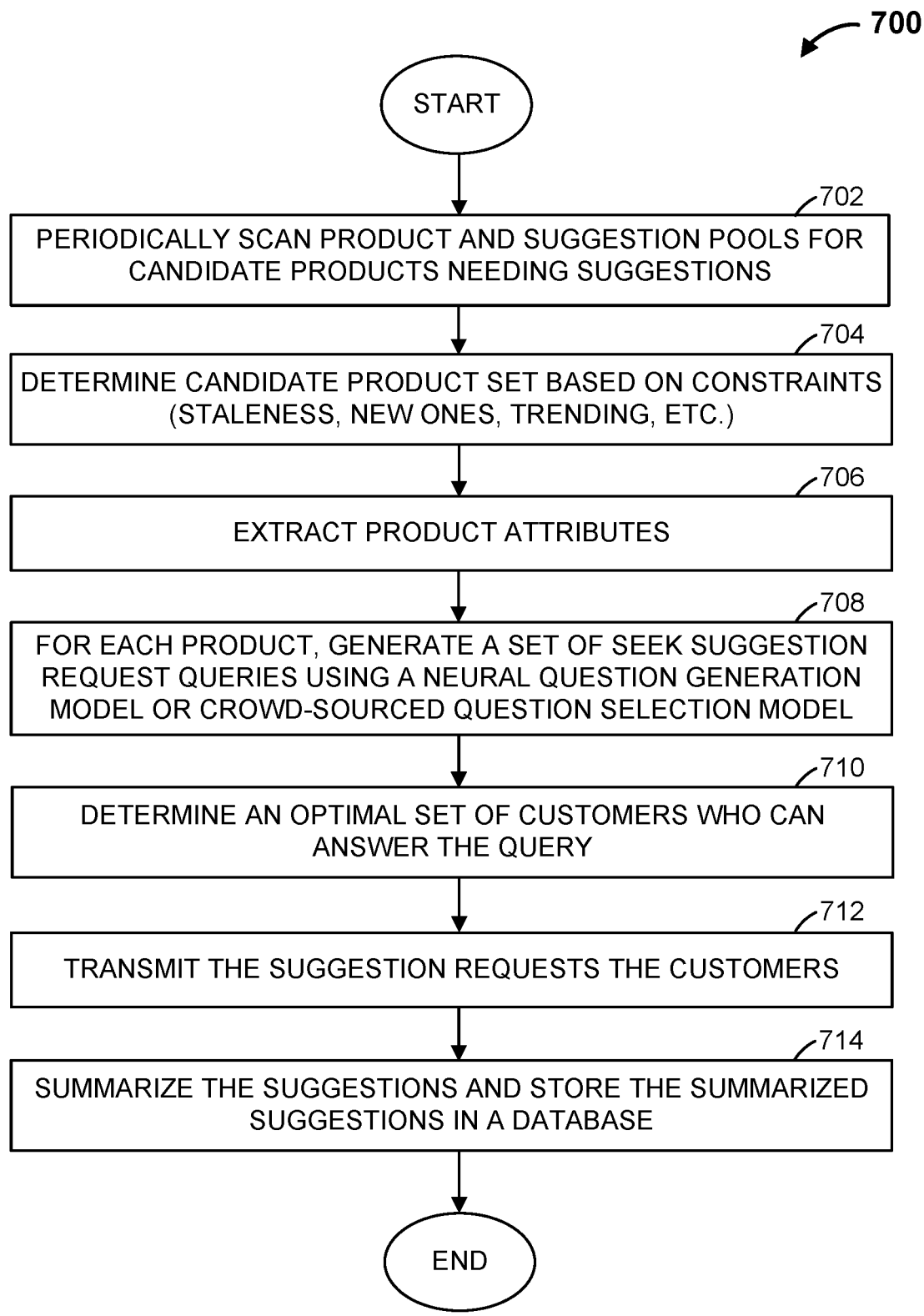
FIG. 7 is a flowchart of another example method that can be carried out by the item review determination computing device of FIG. 1 in accordance with some embodiments.

FIG. 7 is a flowchart of an example method 700 that can be carried out by the computing device, such as the item review determination computing device 102 of FIG. 1. Beginning at step 702, product and suggestion pools (e.g., stored in a database) are periodically (e.g., nightly) scanned for products needing suggestions. At step 704, a candidate product set is determined from the pool of products based on one or more constraints. For example, the computing device may determine items of an item pool that do not have at least a threshold number (e.g., ten, a hundred) of reviews that were provided within a period of time (e.g., over the last month). In some examples, the computing device determines the candidate product set based on products that are trending, but do not have at least a threshold number of reviews that were provided within a period of time.

At step 706, product attributes are extracted for each product of the candidate product set. For example, the computing device may access a database, such as database 116, and obtain attributes for each of the products. At step 708, a set of seek suggestion queries are generated for each product of the candidate product set. The seek suggestion queries may be generated based on a neural network based question generation model. In some examples, the seek suggestion queries may be generated based on a crowd-sourced question selection model.

Proceeding to step 710, an optimal set of customers who may answer the seek suggestion queries are identified. For example, Matcher 508 may match the generated seek suggestion queries to the optimal set of customers. At step 712, the seek suggestion requests are transmitted to the optimal set of customers. For example, the computing device may transmit the seek suggestion requests to customer computing device 112 of each of the optimal set of customers. Proceeding to step 714, suggestions (e.g., customer responses), as received from one or more of the optimal set of customers, are summarized and stored in a database. For example, Suggestion Summarizer 516 may generate summarized suggestions 521 based on the suggestions, and may store the summarized suggestions 521 in Summarized Suggestion Store 526. The method then ends.

Figure 8:
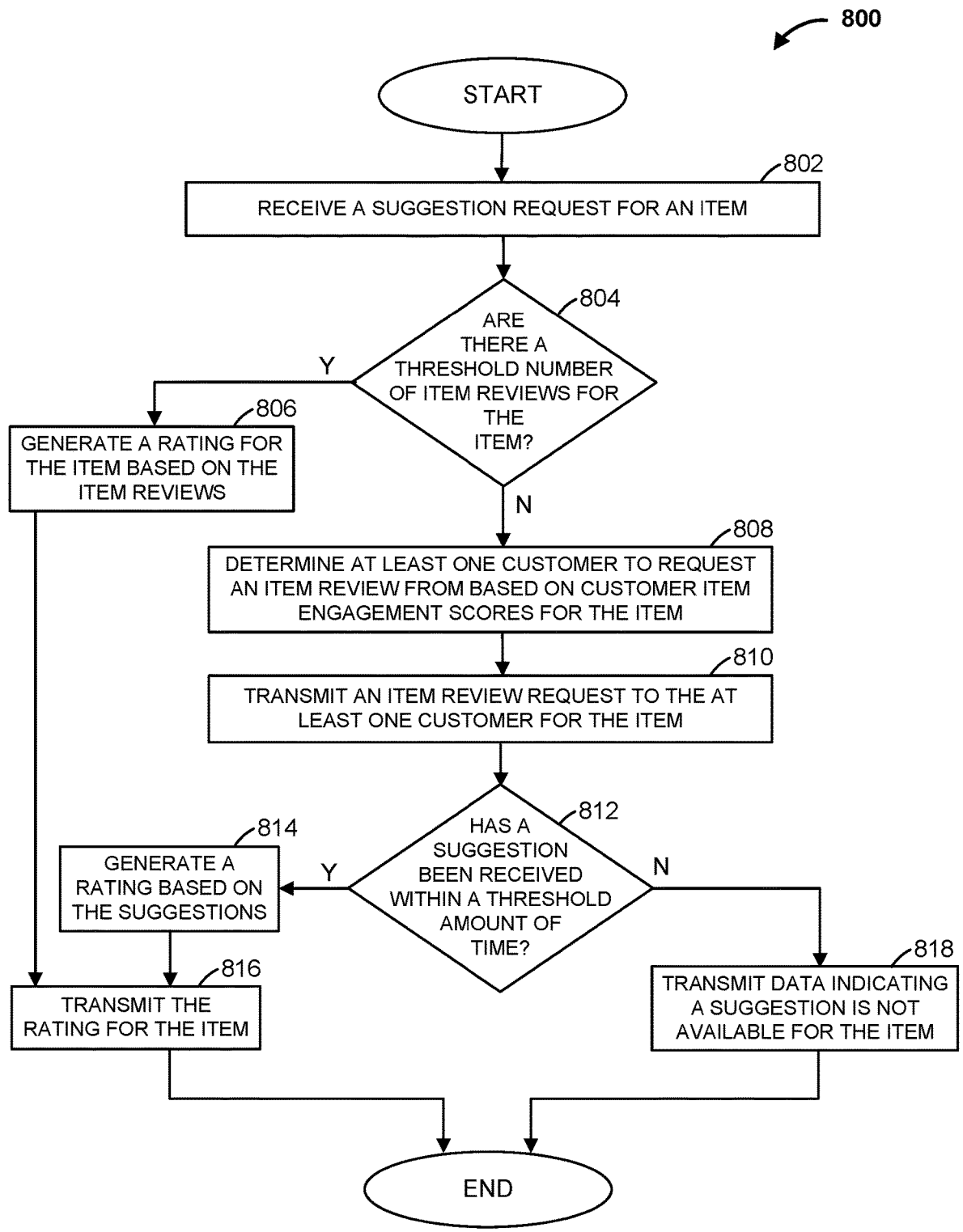
FIG. 8 is a flowchart of yet another example method that can be carried out by the item review determination computing device of FIG. 1 in accordance with some embodiments.

FIG. 8 is a flowchart of an example method 800 that can be carried out by a computing device, such as the item review determination computing device 102 of FIG. 1. Beginning at step 802, a suggestion request for an item is received. For example, a customer may click on a seek suggestion 320 display area (e.g., icon) of an item review widget 310 310 on the product detail page, causing the suggestion request to be transmitted to, and received by, the computing device. At step 804, a determination is made as to whether there are a threshold number of item reviews for the item.

If there are at least the threshold number of item reviews for the item, the method proceeds to step 806, where a rating for the item is generated based on the item reviews for the item. For example, the computing device may execute a machine learning model to assign each textual review a value, and the computing device may determine a rating for the item based on the values. In some examples, the computing device may determine the rating based on an average of numerical item reviews. The method then proceeds to step 816.

If, at step 804, there are not at least the threshold number of item reviews, the method proceeds to step 808. At step 808, at least one customer to request an item review from is determined (e.g., identified). The customer is determined based on item engagement scores of the customer for the item. The method then proceeds to step 810, where an item review request is transmitted to the determined customers. For example, suggestion servicing engine 408 may transmit item review requests to customer computing devices 112A, 112B, and 112C.

From step 810, the method proceeds to step 812, where a determination is made as to whether a suggestion (e.g., customer response from one of the determined customers) has been received within a threshold amount of time (e.g., ten seconds, a minute). If a response has been received within the threshold amount of time, the method proceeds to step 814. The computing device then generates a rating based on the suggestions at step 814. The method proceeds to step 816.

At step 816, the rating for the item is transmitted. For example, the computing device may transmit the rating to web server 104. Web server 104 may then display the rating on an item detail page for the item, such as by displaying item reviews 370 on item detail page 300. The method then ends.

At step 812, if a response is not received within the threshold amount of time, the method proceeds to step 818. At step 818, data indicating that a response is not available for the item is transmitted. For example, the computing device may transmit an indication that no response is currently available to web server 104. Web server 104 may then display a message based on the indication on an item detail page for the item, such as by displaying "Not Available" within item reviews 370 on item detail page 300. The method then ends.

Figure 9:
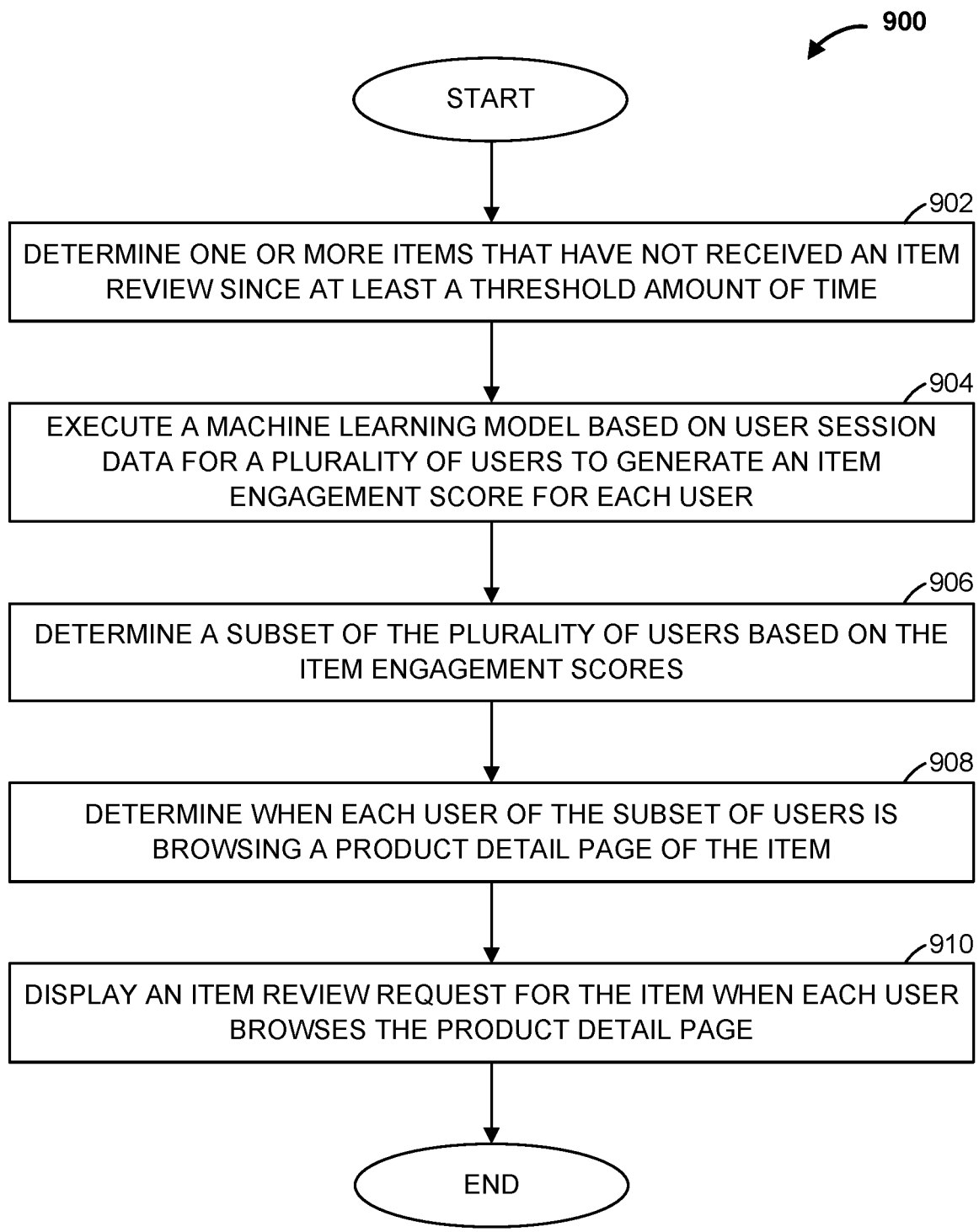
FIG. 9 is a flowchart of even another example method that can be carried out by the item review determination computing device of FIG. 1 in accordance with some embodiments.

FIG. 9 is a flowchart of an example method 900 that can be carried out by a computing device, such as the item review determination computing device 102 of FIG. 1. Beginning at step 902, one or more items that have not received an item review since at least a threshold amount of time are determined. For example, the computing device may search a database, such as database 116, for item reviews for each item of a pool of items. The computing device may determine whether any item review for each item is dated (e.g., timestamped) since the threshold amount of time (e.g., since the last week, since the last month, etc.).

At step 904, the computing device executes a machine learning model based on user session data for a plurality of users to generate an item engagement score for each user. For example, the computing device may execute the machine learning model based on user session data for each user to generate an item engagement score for each user.

At step 906, a subset of the plurality of users are determined based on the item engagement scores. For example, the computing device may identify a number of users (e.g., ten, hundred, etc.) based on the highest item engagement scores.

Proceeding to step 908, a determination is made as to when each user is browsing an item detail page of each of the one or more items. For example, web server 104 may determine when each user is browsing an item detail page 300 corresponding to each item. At step 910, an item review request is displayed on an item detail page each user is browsing. The item review request may be for the item corresponding to the item detail page being browsed by the user. In some examples, the item review request may be for an item that has been determined to be high-engagement with the customer, such as through browsing, previous purchases, or written reviews about the item. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
determine an item that has not received an item review within a period of time;
determine an item engagement value for each of a plurality of users based on user session data for the item for each of a plurality of users, wherein determining the item engagement value for each of the plurality of users comprises: determining, based on the user session data for the item, a number of engagements, and determining an item score for each of the plurality of users based on the number of engagements;

determine a subset of the plurality of users based on the item engagement values;

determine when each user of the subset of the plurality of users is browsing an item detail page of a web site corresponding to the item; and display an item review request for the item when each user is determined to be browsing the item detail page.

2. The system of claim 1, wherein determining the item engagement value for each of the plurality of users comprises applying a suggestion assignment algorithm to the item scores to determine the item engagement value.

3. The system of claim 1, wherein displaying the item review request for the item when each user is determined to be browsing the item detail page comprises transmitting the item review request to a web server, wherein the web server is configured to determine when each user is browsing the item detail page, and display the item review request to each user when each user is determined to be browsing the item detail page.

4. The system of claim 1 wherein the computing device is configured to:
receive an item review response from at least one of the subset of the plurality of users; and
store the item review response in a database.

5. The system of claim 4, wherein the computing device is configured to:
aggregate the item review responses in the database; and
generate an aggregate item review response based on the aggregated item review responses.

6. The system of claim 5, wherein the computing device is configured to:
receive an item review request in response to a first user engaging a portion of a website; and
transmit, in response to the item review request, the aggregate item review response.

7. The system of claim 4, wherein the item review response comprises at least one of Boolean data, numeric data, or textual data.

8. The system of claim 1, wherein determining the subset of the plurality of users further comprises, for each of the plurality of users:
determining a first number of item review requests the user has issued;
determining a second number of item review requests the user has responded to; and
applying at least one rule to the first number of item review requests and the second number of item review requests to determine whether the user is to be included in the subset of the plurality of users.

9. The system of claim 8, wherein the at least one rule comprises a bipartite graph.

10. The system of claim 1, wherein the computing device is configured to:
obtain, from a database, item attributes for the item;
generate features based on the obtained item attributes; and
apply a trained neural network to the generated features to generate the item review request.

11. The system of claim 10, where the computing device is configured to train the trained neural network with a training set of data that is based on item review requests and corresponding item review responses for a plurality of items.

12. A method by at least one processor, the method comprising:
determining an item that has not received an item review within a period of time;
determining an item engagement value for each of a plurality of users based on user session data for the item for each of a plurality of users, wherein determining the item engagement value for each of the plurality of users comprises: determining, based on the user session data for the item, a number of engagements, and determining an item score for each of the plurality of users based on the number of engagements;
determining a subset of the plurality of users based on the item engagement values;
determining when each user of the subset of the plurality of users is browsing an item detail page of a website corresponding to the item; and
displaying an item review request for the item when each user is determined to be browsing the item detail page.

13. The method of claim 12, wherein determining the item engagement value for each of the plurality of users comprises applying a suggestion assignment algorithm to the item scores to determine the item engagement value.

14. The method of claim 12, further comprising:
receiving an item review response from at least one of the subset of the plurality of users;
aggregating the item review responses in a database;
generating an aggregate item review response based on the aggregated item review responses;
receiving an item review request in response to a first user engaging a portion of a website; and
transmitting, in response to the item review request, the aggregate item review response.

15. The method of claim 12, wherein determining the subset of the plurality of users further comprises, for each of the plurality of users:
determining a first number of item review requests the user has issued;
determining a second number of item review requests the user has responded to; and
applying at least one rule to the first number of item review requests and the second number of item review requests to determine whether the user is to be included in the subset of the plurality of users.

16. A non-transitory, computer-readable storage medium comprising executable instructions that, when executed by one or more processors, cause the one or more processors to:
determine an item that has not received an item review within a period of time;
determine an item engagement value for each of a plurality of users based on user session data for the item for each of a plurality of users, wherein determining the item engagement value for each of the plurality of users comprises: determining, based on the user session data for the item, a number of engagements, and determining an item score for each of the plurality of users based on the number of engagements;
determine a subset of the plurality of users based on the item engagement values;
determine when each user of the subset of the plurality of users is browsing an item detail page of a website corresponding to the item; and
display an item review request for the item when each user is determined to be browsing the item detail page.

17. The computer-readable storage medium of claim 16, wherein the executable instructions, when executed by the one or more processors, cause the one or more processors to:
receive an item review response from at least one of the subset of the plurality of users;
aggregate the received item review responses in a database;

generate an aggregate item review response based on the aggregated item review responses;

receive an item review request in response to a first user engaging a portion of a website; and transmit, in response to the item review request, the aggregate item review response.

18. The computer-readable storage medium of claim 16, wherein the executable instructions, when executed by the one or more processors, cause the one or more processors to:

determine a first number of item review requests the user has issued;

determine a second number of item review requests the user has responded to; and apply at least one rule to the first number of item review requests and the second number of item review requests to determine whether the user is to be included in the subset of the plurality of users.

* * * * *